United States Patent Office 3,085,607
Patented Apr. 16, 1963

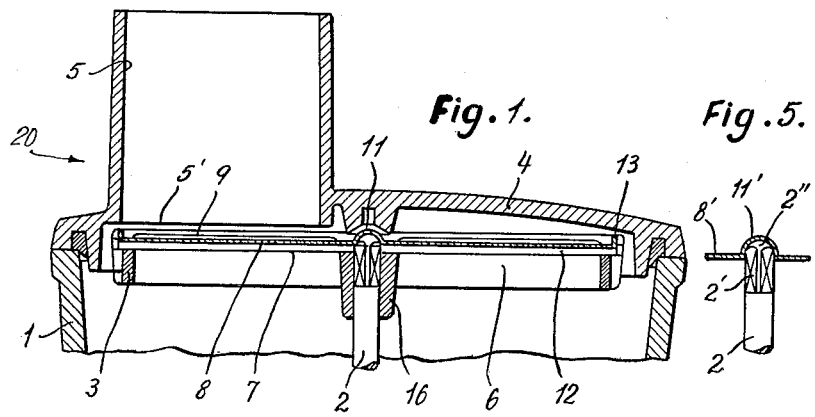
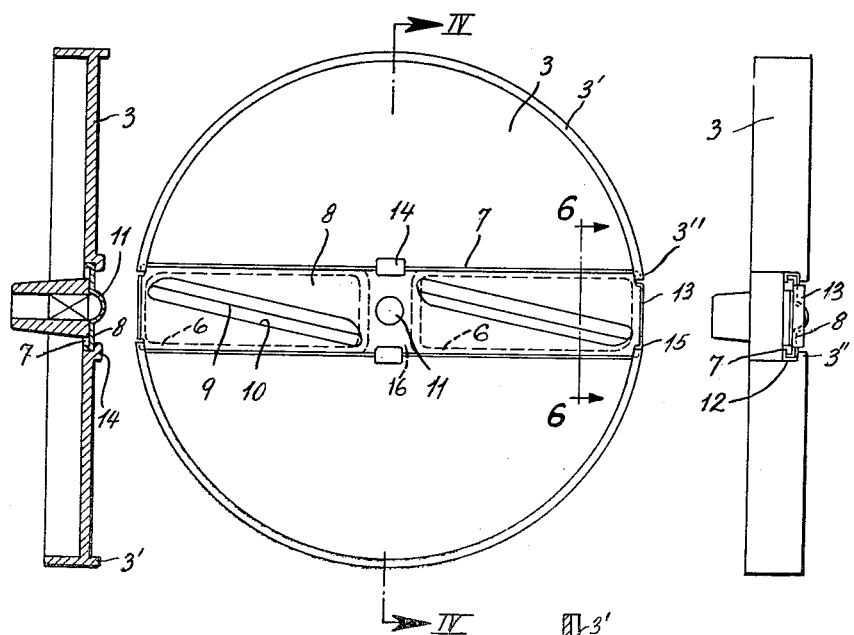

3,085,607
FOOD SLICER
Hans Schöttle, Reichenbach (Fils), Germany, assignor to Electrostar G.m.b.H., Reichenbach (Fils), Germany
Filed Dec. 23, 1959, Ser. No. 861,472
Claims priority, application Germany Apr. 10, 1959
6 Claims. (Cl. 146—124)

The present invention relates, in general, to a kitchen appliance and, in particular, to a food slicing or shredding attachment therefor.

The present invention is specifically related to the general type of kitchen appliance known as a food mixer which has provision, in the form of various attachments, for effecting other types of food preparing processes, such as, slicing, shredding, beating, grinding, etc. In one such type of machine, the food which is to be cut or ground is inserted into a funnel or feed nipple and a disk rotates below the funnel. The disk is provided with readily replaceable tools which are generally of rectangular or strip formation. The tool strips are inserted into the disk radially of the latter.

Prior to the present invention the strip-shaped tools or blades were connected with the free end of the shaft utilized to rotate the disk, said connection being effected by a screw joint.

At each time that it was necessary to change a tool, the screw nut had to be loosened in a relatively cumbersome manner.

It is an object of the present invention to provide means which result in the obviation of the disadvantages of the prior art.

It is another object of the present invention to provide means which result in the attainment of a tool strip which can be readily secured in operating disposition in a simple and facile manner.

It is a still further object of the present invention to provide means which ensure a constant distance between the bottom edge of the feeding funnel and the blades of the strip tool for various different types of tools or attachments.

The above and other objects of the invention will become further apparent from the following detailed description, reference being made to the accompanying drawings, showing a preferred embodiment of the invention.

In the drawings which illustrate the best mode for carrying out the invention:

FIG. 1 is a vertical sectional view showing the upper part of the bowl or container of an electric food preparing kitchen appliance, with associated parts;

FIG. 2 is a top plan view of a tool disk with a tool attachment inserted therein;

FIG. 3 is an end view of the disk;

FIG. 4 is a sectional view taken on the line IV—IV;

FIG. 5 is a fragmentary view of a portion of the device shown in FIG. 1; and

FIG. 6 is a section taken on the line 6—6 of FIG. 2.

Briefly described, the present invention provides a simplified means for connecting a food processing tool or attachment with the rotary disk of the food mixer. The tool or attachment, in the form of a rectangular strip, is provided with a centrally disposed stamped or raised head which is engaged by the free end of the shaft which drives the disk, in order to secure the tool attachment in its operating disposition. The central head has a different depth with various different tool strips so that the same or a constant distance is always ensured between the bottom edge of the feed funnel and the blades of the tool strip.

Referring now to the drawings in detail, there is shown a kitchen appliance constituted by an electric food mixer or processing device 20. Said device has a mixing bowl or container 1 which is mounted in conventional manner on a central drive shaft 2 which is driven in conventional manner by a conventional drive motor (not illustrated).

At its free end, shaft 2 has a square head 2'. A disk 3 is secured on the shaft by engagement of a hub portion 16 having a square bore engaged on the square end 2'. A cover 4 is provided on the upper end of bowl 1. The cover has a funnel or nipple 5 for feeding food to be processed to the appliance. The bottom edge of the funnel is shown at 5'.

The disk 3 is provided with conventional cut-outs or slots 6 for the passage of the cut or shredded food through the disk into the container 1.

The disk has a radial groove 7 above a rectangular slot 6 defined on each side of the center line of the disc 3. A rectangular or strip-shaped cutting, shredding, or grinding attachment or tool 8 can be inserted in the groove. In the illustrated embodiment, the tool attachment 8 has knife blades 9 stamped from the sheet material thereof. Slots 10 are arranged below blades 9 for the passage of the cut food through the tool, the food passing through the slots 6 in the disk into the receptacle 1. The blades of different tools differ in the distance between the blade and the tool surface, or the tool may be provided with stamped bent-up teeth for grinding the food. For proper food processing operation, it is important that the distance between the bottom edge 5' of the funnel and the knife blades or the tips of the grinding teeth is always the same.

In the illustrated embodiment each tool strip 8 is provided at its center with an upwardly bent head 11. The long sides 12 of each strip are bent angularly downwardly. In addition to tool strip 8, the transverse sides 13 serve also as handles for gripping the tool strip. The downwardly bent long sides 12 engage in the disk groove 7. As here shown, the disk is provided at its center with the two opposing lugs 14 which overlap the groove 7 and the portions of the strip inserted therein; the peripheral edges 3' of the disk is cut-out at the opposite ends of the groove 7. Small edge projections 3" overlap the groove 7 and the inserted strip, as best seen in FIG. 3.

A selected tool strip or attachment 8 is inserted radially into the groove 7, the disk then being attached to the drive shaft. The preferably rounded end 2" of head 2' of the drive shaft engages in head 11, preferably from the bottom. The disc 3 is carried by the tool strip 8 since the entire weight of the disc 3 and the strip 8 is held by the end 2" of the driving shaft 2. The disc 3 with its hub 16 is secured on the drive shaft for rotation therewith but it is movable in an axial direction along the shaft. Due to the overlap of lugs 14 and projections 3" of the disk edge, the disk is fixed also in radial direction.

In the illustrated strip 8, as best seen in FIG. 1, the blades 9 are raised slightly above the upper strip surface. Correspondingly, head 11 has a relatively low depth. FIG. 5 shows another tool strip 8', where the knife blades (not illustrated) are spaced to a greater extent upwardly from the upper surface of the strip than in the case of the strip in FIG. 1.

Correspondingly, head 11' in FIG. 5 is deeper, so that strip 8' and thus disk 3, are positioned deeper into bowl 1. Due to the different depth of heads 11 and 11', the knife blades 9 of the different tool attachments are always spaced the same distance from the bottom edge 5' of the funnel.

The disk 3 has a hub 16 which is so constructed that it can be disposed at different positions axially of the shaft 2. Shaft 2 absorbs the weight of the disk through the heads 11 or 11'.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In a kitchen appliance for processing food including a container, a feed funnel mounted over said container and a drive shaft extending upwardly in said container and having a free end, the improvement comprising a disc tool member mounted for rotation beneath said funnel on said shaft, said disc tool member having a cut-out portion extending across the center of rotation thereof adjacent its connection with said shaft, and a removable food processing attachment positionable in said disc cutout portion including a tool defined therein, a central head portion engageable with the free end of said drive shaft to fix the attachment in a radial direction and to support said disc tool on said shaft, and retaining means on said disk and partially overlapping said cut-out portion to prevent axial removal of the attachment from the cut-out portion, said head being of a size to position said tool at a predetermined constant distance below said feed funnel whereby attachments having tools of different heights can all be disposed with the tops of said tools at the same distance from said feed funnel.

2. In a kitchen appliance according to claim 1, wherein said disc tool member includes a central portion engageable with said shaft for rotation therewith but axially movable therealong, said cutout portion extending diametrically across said disc tool member and said attachment being a plate member slidable in said cut-out portion.

3. A kitchen appliance as set forth in claim 1, further characterized in that the tool attachment is of rectangular configuration, the long sides of the tool being bent downwardly, said disc having a groove defined therein in which said bent sides engage.

4. A kitchen appliance as set forth in claim 1, further characterized in that the tool attachment is of rectangular configuration, the long sides of the tool being bent downwardly, said disc having a groove defined therein in which said bent sides engage, said retaining means being opposing confronting lugs provided on said disk in straddling relation to said raised head and confronting pairs of peripheral projections on said disk overlying the opposite ends, respectively, of the disk groove.

5. A kitchen appliance as set forth in claim 1, further characterized in that the tool attachment is of rectangular configuration, the long sides of the tool being bent downwardly, said disc having a groove defined therein in which said bent sides engage, the transverse sides of said strip being bent angularly upwardly.

6. In combination with a kitchen comminuting appliance having (a) a receptacle,
(b) a feeding funnel above said receptacle, and
(c) a vertically extending rotatable drive shaft in said receptacle with a free upper end;

a disk tool assembly comprising a disk having a central open hub portion, said hub portion being adapted to fit over said free end of said shaft for axial movement therealong and for corotation with said shaft, said disk further including a diametrically extending cut-out portion, a comminuting tool having a predetermined tool height and being of a size to fit into said cut-out portion and to be lodged therein, said tool having a central head portion of a size and depth to fit over the free end of said shaft and to support the tool at a fixed level below said feeding funnel in conformity with the height of said tool, and retaining means overlapping said cut-out portion permitting insertion and withdrawal of said tool into said cut-out portion in a radial direction but preventing such insertion and withdrawal in an axial direction, whereby upon insertion of said tool into said cut-out portion and engagement of said head portion on said free shaft end said disk is carried by said tool.

References Cited in the file of this patent

UNITED STATES PATENTS

| 1,443,948 | Creed | Feb. 6, 1923 |
| 2,550,895 | Weismueller | May 1, 1951 |
| 2,796,103 | Feinstein | June 18, 1957 |

FOREIGN PATENTS

| 657,387 | Great Britain | Sept. 19, 1951 |